(12) United States Patent
Lee et al.

(10) Patent No.: US 8,901,508 B2
(45) Date of Patent: Dec. 2, 2014

(54) DIGITAL X-RAY DETECTOR

(75) Inventors: Sang-Il Lee, Yongin-si (KR); Beom-Jin Moon, Suwon-si (KR)

(73) Assignee: Drtech Corporation, Seongnam-si (KR)

( * ) Notice: Subject to any disclaimer, the term of this patent is extended or adjusted under 35 U.S.C. 154(b) by 0 days.

(21) Appl. No.: 13/885,753

(22) PCT Filed: May 18, 2011

(86) PCT No.: PCT/KR2011/003680
§ 371 (c)(1),
(2), (4) Date: Jul. 23, 2013

(87) PCT Pub. No.: WO2012/067325
PCT Pub. Date: May 24, 2012

(65) Prior Publication Data
US 2013/0292577 A1    Nov. 7, 2013

(30) Foreign Application Priority Data
Nov. 17, 2010   (KR) .................. 10-2010-0114587

(51) Int. Cl.
  *G01J 1/42*    (2006.01)
  *G01T 1/16*    (2006.01)
  *G01T 1/24*    (2006.01)

(52) U.S. Cl.
CPC .. *G01T 1/16* (2013.01); *G01T 1/244* (2013.01)
USPC ........................................................ 250/394

(58) Field of Classification Search
CPC ... G03B 42/04; G01T 1/244; H01L 27/14618
USPC ............................................................. 250/394
See application file for complete search history.

(56) References Cited

U.S. PATENT DOCUMENTS

| | | | |
|---|---|---|---|
| 5,804,832 A | 9/1998 | Crowell et al. | |
| 6,700,126 B2 * | 3/2004 | Watanabe | 250/370.09 |
| 7,429,737 B2 * | 9/2008 | Wojcik et al. | 250/370.09 |
| 2002/0005490 A1 * | 1/2002 | Watanabe | 250/370.09 |
| 2005/0056789 A1 * | 3/2005 | Spahn et al. | 250/370.09 |
| 2007/0272873 A1 * | 11/2007 | Jadrich et al. | 250/370.11 |
| 2008/0078940 A1 | 4/2008 | Castleberry et al. | |
| 2008/0087832 A1 | 4/2008 | Sato et al. | |
| 2009/0122959 A1 * | 5/2009 | Jadrich et al. | 378/91 |
| 2010/0158197 A1 * | 6/2010 | Jadrich et al. | 378/189 |

FOREIGN PATENT DOCUMENTS

| | | |
|---|---|---|
| JP | 2001-504940 | 4/2001 |
| JP | 2008-096998 | 4/2008 |
| KR | 10 2007-0063007 | 6/2007 |

\* cited by examiner

*Primary Examiner* — Kiho Kim
(74) *Attorney, Agent, or Firm* — NSIP Law

(57) ABSTRACT

There is provided a digital X-ray detector including an X-ray detection array configured to detect an X-ray image when a subject is irradiated with X-ray; a support board supporting a bottom of the X-ray detection array; a case accommodating both the X-ray detection array and the support board and having a plurality of insertion portions formed on four sidewalls thereof; and shock abortion members, each installed to each of the insertion portion and having a head resting on an outer wall of the case and a protrusion extended from the head to thereby be in contact with a sidewall of the support board.

18 Claims, 10 Drawing Sheets

DIGITAL X-RAY DETECTOR

CROSS-REFERENCE TO RELATED APPLICATION

This application is a National Stage of International Application No. PCT/KR2011/003680, filed May 8, 2011 and published as WO 2012/067325 on May 24, 2012, which claims the benefit of Korean Patent Application No. 10-2010-0114587, filed on Nov. 17, 2010, in the Korean Intellectual Property Office, the entire disclosures of which are incorporated herein by reference for all purposes.

BACKGROUND

1. Field

The following description relates to a digital X-ray detector for obtaining a digital image using a Thin Film Transistor (TFT) without a film.

2. Description of the Related Art

A conventional X-ray image photographing system is used in a medical industry to photograph a subject onto a film and, and the resulting film needs to be printed for diagnosis. However, many research and studies have been conducted recently to develop a digital X-ray detector for obtaining a digital image using a TFT without a film.

For example, a digital X-ray detector may have an X-ray detection array which is fixed onto an external case thereof. At this time, the X-ray detection array includes a glass substrate, a TFT laminated on the glass substrate, a light converting material layer of amorphous selenium laminated on the TFT, an insulating layer formed on the light converting material layer and top electrodes formed on the insulating layer.

When the X-ray detection array is irradiated with X-rays, the X-ray produces electron-hole pairs in the light converting material layer. The electron-hole pairs are accelerated by power which is applied to top electrodes, so that the electrons may be transferred to external electrodes and the holes may be charged in a headacity of the TFT via upper electrodes of the TFT. Then, the TFT is switched on and off, an X-ray detection image may be obtained.

However, the above-mentioned digital X-ray detector are highly likely to be exposed to external forces since the X-ray image photographing system is often used outside. For example, while being moved or used, the digital X-ray detector may fall over or an external force may be imposed thereon.

In such cases, elements of the digital X-ray detector, such as a light converting material layer, a TFT and a glass substrate, may be damaged, thereby affecting performance of the digital X-ray detector. For this reason, it is required to come up with a measure to protect the X-ray detection array from a shock.

SUMMARY

In order to solve the above drawbacks, the present invention provides a digital X-ray detector capable of protecting fragile elements therein and being assembled more easily.

In one general aspect, there is provided a digital X-ray detector including an X-ray detection array configured to detect an X-ray image when a subject is irradiated with X-ray; a support board supporting a bottom of the X-ray detection array; a case accommodating both the X-ray detection array and the support board and having a plurality of insertion portions formed on four sidewalls thereof; and shock abortion members, each installed to each of the insertion portion and having a head resting on an outer wall of the case and a protrusion extended from the head to thereby be in contact with a sidewall of the support board.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

Figure 1:
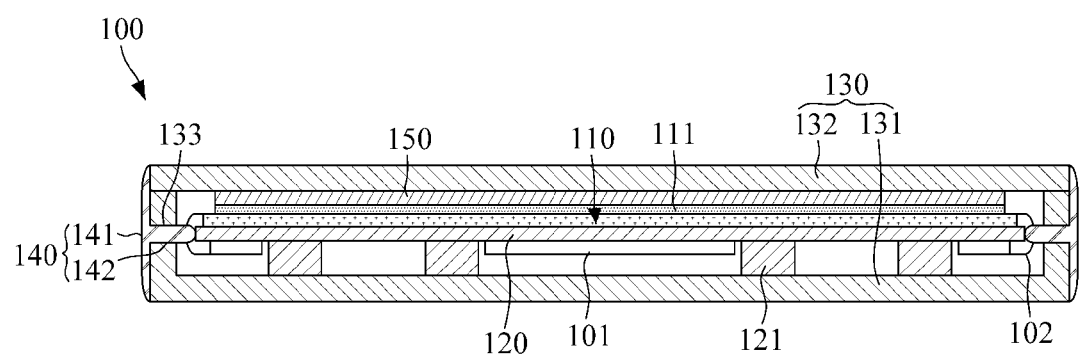
FIG. 1 is a cross-sectional view of a digital X-ray detector according to an exemplary embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

Figure 2:
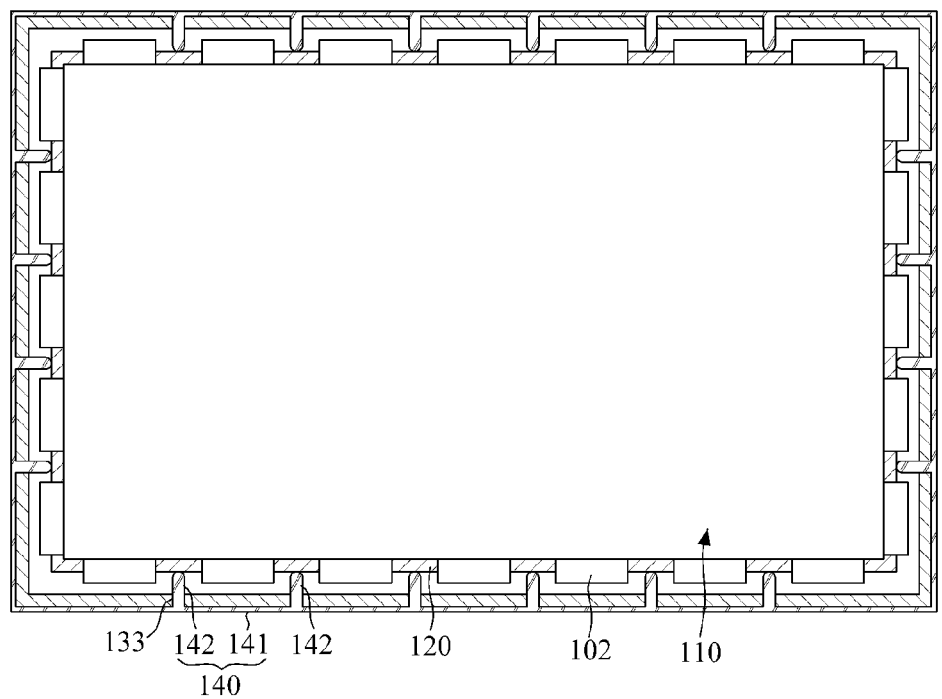
FIG. 2 is an elevation view of the digital X-ray detector of FIG. 1.

FIG. 1 is a sectional view illustrating a digital X-ray detector according to an exemplary embodiment of the present invention. FIG. 2 is a plain view illustrating the digital X-ray detector shown in FIG. 1.

Referring to FIGS. 1 and 2, a digital X-ray detector 100 includes an X-ray detection array 110, a support board 120, a case 130 and shock absorption members 140.

The X-ray detection array 110 detects an X-ray image when a subject is irradiated with X-rays. In this embodiment, the X-ray detection array 110 may convert the X-rays directly into electric charge. For example, the X-ray detection array 110 includes a glass substrate, a Thin Film Transistor (TFT) laminated on the substrate, a light converting material layer 111 of amorphous selenium which is laminated on the TFT, an insulating layer formed on the light converting material layer 111, and top electrodes formed on the insulating layer.

If a top surface of the X-ray detection array 110 is irradiated with X-ray, the light converting material layer 111 is ionized to thereby produce electron-hole pairs. The electron-hole pairs are accelerated by power applied to the top electrodes, so that electrons may be transferred to external electrodes and the holes may be charged in a headacitor of the TFT via the upper electrodes of the TFT. Then, the TFT is switched on and off, an X-ray detection image may be obtained.

The X-ray detection array 110 is deposited on the top surface of the support board 120, so that the support board 120 supports the lower part of the X-ray detection array 110. In addition, a circuit board 101 may be mounted to the bottom surface of the support board 120, and may be electrically connected to the X-ray detection array 110 through connecting members 102. If the X-ray detection array 110 is in the form of a rectangular plate, the support board 120 may be a rectangular plate having four sides. Moreover, the support board 120 may be supported by a plurality of bosses 121 formed on the bottom surface of the case 130.

The case 130 accommodates the X-ray detection array 110 and the support board 120. The case 130 surrounds the X-ray detection array 110 for protection, and may be made of carbon and etc. so as to reduce an external shock. The external case 130 may consist of a cabinet 131 and a cover 132. The cabinet 131 may includes a flat bottom surface, four side walls and an open top. The cover 132 is configured to cover the open top of the cabinet 131, and is fixed to the cabinet 131 in a way of covering the open top of the cabinet 131. In addition, the case 130 includes insertion portions 133 formed on the four side walls of the cabinet 131.

The shock absorption members 140 are respectively inserted through the insertion portions 133. Each of the shock absorption members 140 includes a head 141 and a protrusion 142. The head 141 rests on the outer wall of the case 130. The protrusion 142 is extended from the head 131 to be inserted through the insertion portion 133 to thereby be in contact with a side wall of the support board 120. The head 141 prevents the protrusion 142 from being penetrating the inside of the case 130.

When there is no external shock imposed to the digital X-ray detector 100, the shock absorption members 140 respectively inserted through the insertion portions 133 supports four side walls of the support board 120. That is, the shock absorption member 140 supports the support board 120 not to be in contact with the inner wall of the case 130. Alternatively, when there is an external shock imposed to the digital X-ray detector 100, the shock absorption members 140 absorb the external shock in a way that the protrusions 142 interposed between the case 130 and the support board 120 are strained. Accordingly, the external shock imposed to the X-ray detection array 110 may be reduced.

Each of the shock absorption members 140 may be made of rubber and the like. The rubber may have a specific hardness not only to absorb an external shock, but also to support the support board 120 so as to protect a sidewall of the support board 120 from being collided with an inner sidewall of the case 130.

With regard to the digital X-ray detector 100 configured as described above, the shock absorption members 140 supports the support board 120 from four sidewalls of the case 130 so as to reduce an external shock, so that fragile elements of the X-ray detection array 110, such as a light converting material layer, a Thin Film Transistor (TFT) and a glass substrate, may be projected.

In addition, in the embodiment of the present invention, although a gap between an inner wall of the case 130 and the support board 120 is narrow, it is possible to insert the shock absorption members 140 into the insertion portions 133 of the case 130 after mounting the support board 120 to the case 130, so that the shock absorption members 140 and the support board 120 may be assembled more easily compared to a related art which discloses mounting the support board 120 to the case 130 after attaching the shock absorption members 140 onto the case 130.

Meanwhile, a buffer 150 may be inserted between the top surface of the X-ray detection array 110 and the inner top surface of the case 130. The buffer 150 absorbs a shock between the X-ray detection array 110 and the case 130 to thereby protect the top surface of the X-ray detection array 110. The buffer 150 may be made of sponge, rubber and the like. In this case, the buffer 150 may also insulate the X-ray detection array 110 from the outside. A compressed buffer 150 may be inserted between the top surface of the X-ray detection array 110 and the inner top surface of the case 130, thereby pressing the X-ray detection array 110.

Figure 3:
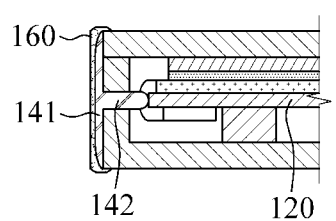
FIG. 3 is a cross-sectional view for explaining an example in which a shock absorption member is fixed by a fixing member with respect to FIG. 1.

The shock absorption members 140 may be respectively fixed onto the insertion portions 133 using adhesives so that the shock absorption members 140 may not be separated from the insertion portions 133. In another example, as illustrated in FIG. 3, the shock absorption members 140 may be fixed by the fixing members 160. Each of the fixing members 160 may encompass each of the shock absorption members 140 in a fixed manner, thereby fixing the shock absorption members 140 onto the case 130.

Figure 4:
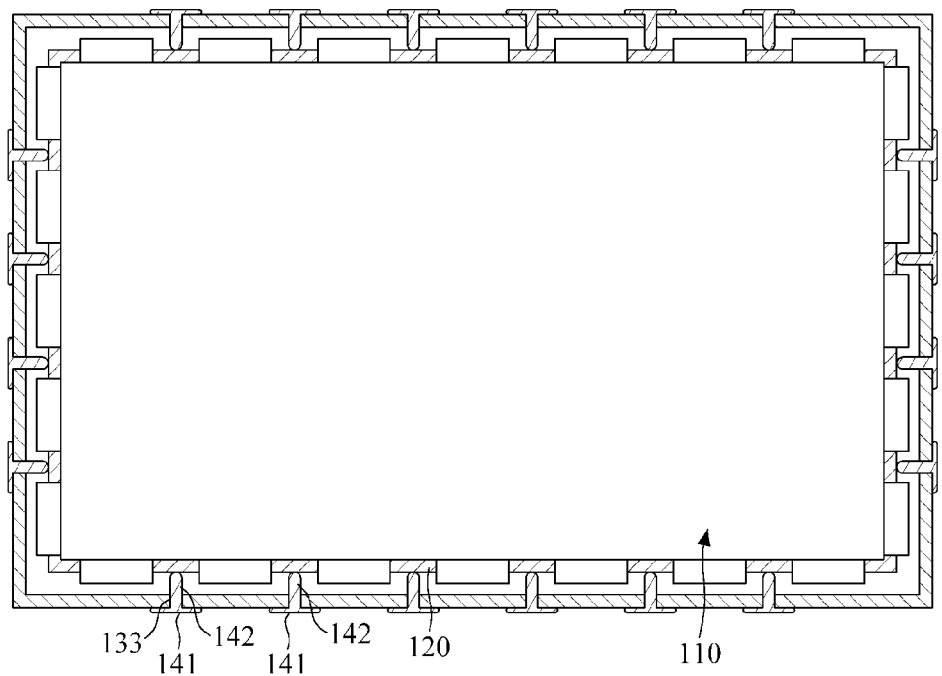
FIG. 4 is an elevation view for explaining a different example of shock absorption members of FIG. 2.

The shock absorption members 140 may be in various forms. For example, the heads 141 of the shock absorption member 140 may be connected to each other to form a closed loop, thereby encompassing a side circumference of the case 130. Of course, the heads 141 of the shock absorption members 140 may be spaced apart from each other, as illustrated in FIG. 4.

Figure 5:
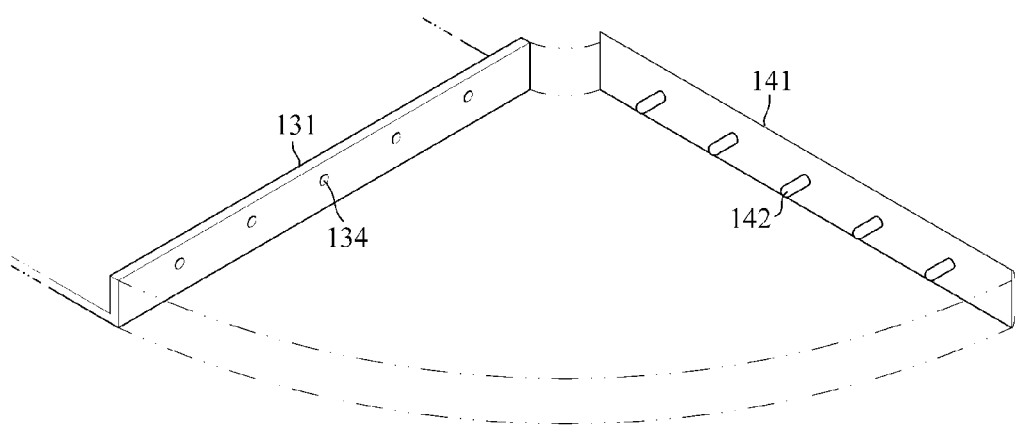
FIG. 5 is an exploded oblique view for explaining an example of insertion portions and protrusions with respect to FIG. 2.
Figure 6:
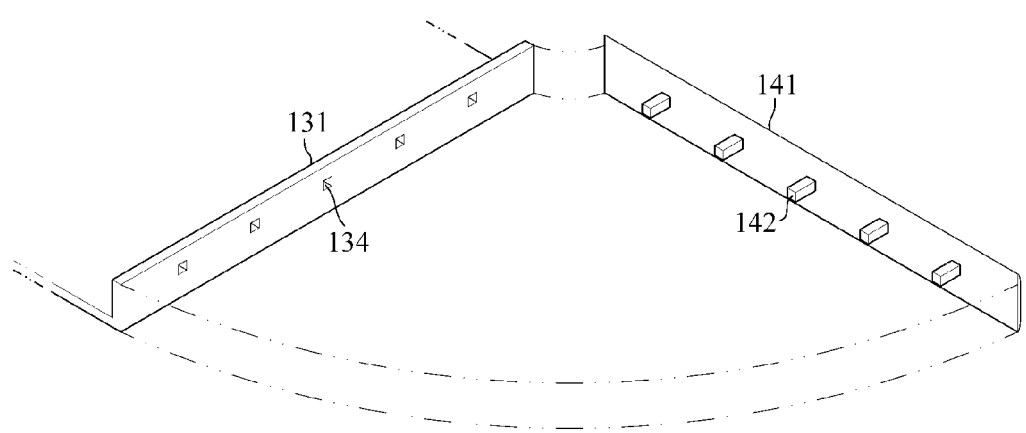
FIG. 6 is an exploded oblique view for explaining a different example of insertion portions and protrusions with respect to FIG. 5.

As illustrated in FIG. 5, each insertion portion 133 may include an insertion hole 134, and a plurality of insertion holes 134 may be formed on sidewalls of the cabinet 131 of the case 130 in a horizontal direction. The insertion hole 134 may include a circular hole. In this case, each protrusion 142 of the shock absorption members 140 may be a cylinder able to be firmly fitted the circular hole. In another example, the insertion hole 134 may include a square hole. In this case, each protrusion 142 of the shock absorption members 140 may be a square bar able to be firmly fitted to the square hole.

Figure 7:
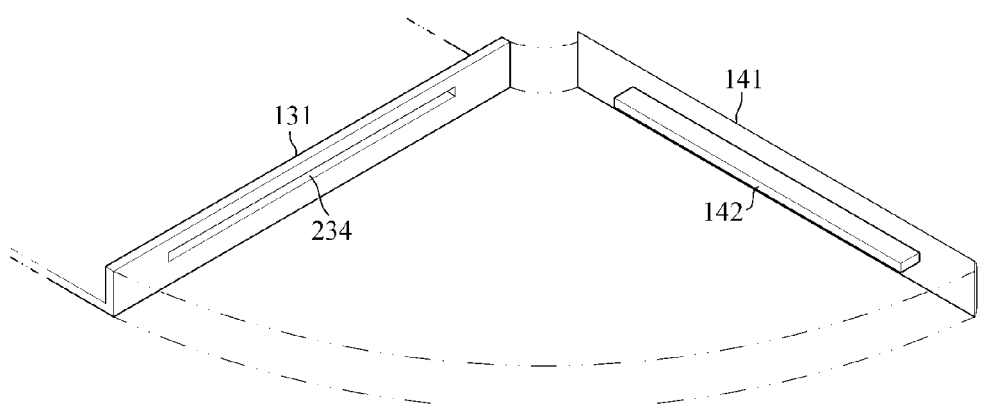
FIG. 7 is an exploded oblique view for explaining a different example of insertion portions and protrusions shown in FIG. 5.

In still another example, as illustrated in FIG. 7, the insertion portion 133 may include a rectangular hole 234 extended from a sidewall of the cabinet 131 in a horizontal direction. In this case, each protrusion 142 of the shock absorption members 140 may be a rectangular bar able to be firmly fitted to the rectangular hole 234.

Figure 8:
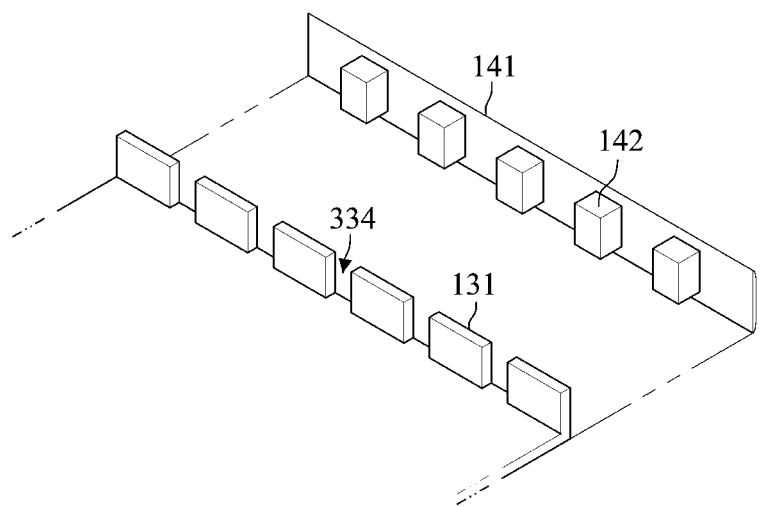
FIG. 8 is an exploded oblique view for explaining a different example of insertion portions and protrusions of FIG. 5.

In yet another example, as illustrated in FIG. 8, the insertion portion 133 may include a plurality of cut grooves 334 which are formed by cutting a top edge of a sidewall the cabinet 131. If each of the cut grooves 334 is a square hole, each protrusion 142 of the shock absorption members 140 may be a square bar able to be firmly fitted to the cut grooves 334. In this case, the protrusion 142 may be fitted into the cut grooves 334 in a top-to-bottom direction, so that it may be easy to assemble the shock absorption members 140 with the cabinet 131. In addition, the cut grooves 334 may be extended to the bottom surface of the cabinet. In this case, the protrusions 142 may be in contact with the bottom surface of the cabinet.

Figure 9:
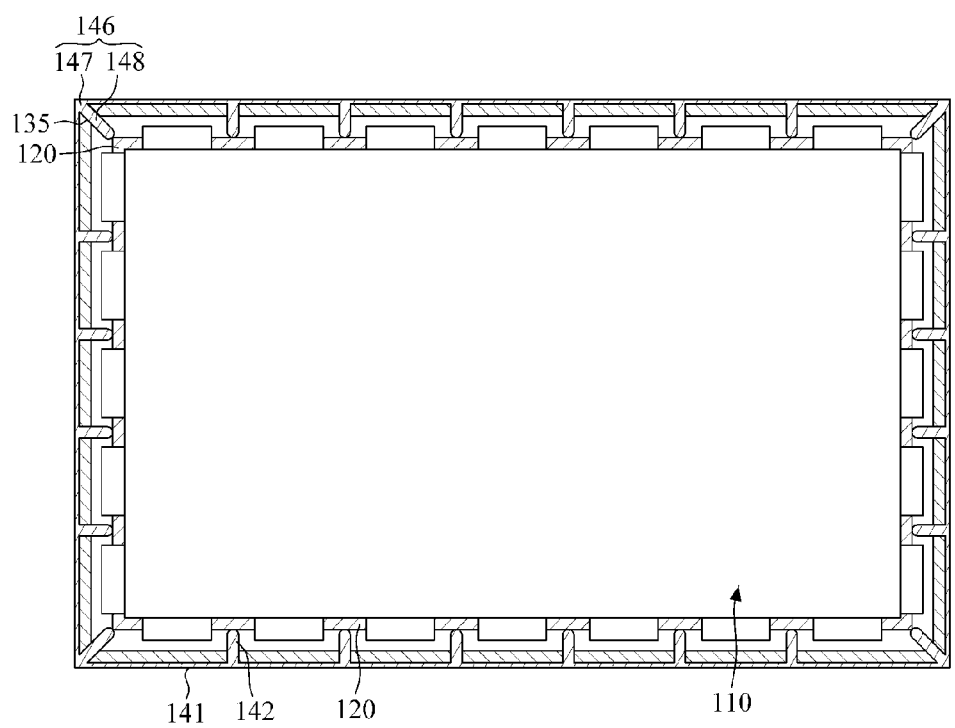
FIG. 9 is a cutaway elevation view illustrating an example in which corner shock absorption members are further included in FIG. 2.

Meanwhile, as illustrated in FIG. 9, the case 130 may further include four corner insertion portions 135 on four corners thereof, respectively. In addition, each of the corner insertion portions 135 has a corner shock absorption member 146 installed thereto. Each of the corner shock absorption member 146 includes a corner head 147 and a corner protrusion 148. The corner head 147 is formed to rest on the corner of the case 130. The corner protrusion 148 is extended from the corner head 147 to be inserted through the corner insertion portion 135 to thereby in contact with a corner of the support board 120.

Figure 10:
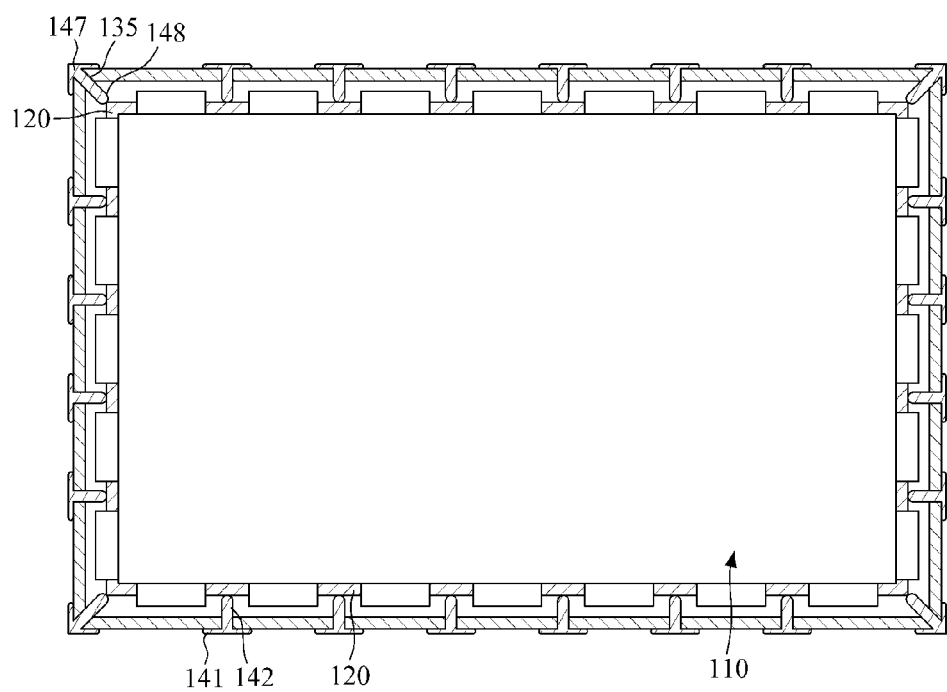
FIG. 10 is a cutaway elevation view illustrating a different example of the corner shock absorption members of FIG. 9.

As the corner shock absorption members 146 support the four corners of the support board 120, thereby improving efficiency both in supporting the support board 120 and in protecting the X-ray detection array 110. The corner head 147 may be connected to the heads 141 on the corner of the support boarder 120, thereby encompassing a side circumference of the case 130. Of course, the corner head 147 may be spaced apart from the heads 141, as illustrated in FIG. 10.

Meanwhile, the protrusions 142 of the shock absorption members 140 may be in contact with a sidewall of the support board 120. In this case, if the support board 120 is moved toward an inner sidewall of the case 130, the protrusions 142 may be strained to absorb a shock. In another example, the protrusions 142 of the shock absorption member 140 may be fixed onto the sidewall of the support board 120 using adhesive. In this case, if the support is moved toward an inner sidewall of the case 130, some of the protrusions 142 formed on a sidewall of the support board 120, the sidewall facing the inner wall of the case 130, is compressed, whereas other protrusions 142 formed on the opposite sidewall of the support board 120 are extended. It is because each of the protrusions 142 are fixed to the support board 120. Accordingly, when an external shock is imposed on the digital X-ray detector 100, a more enhanced shock absorption effect is expected. In addition, the corner protrusions 148 of the corner shock absorption members 146 may be fixed onto the corners of the support board 120, respectively.

According to the exemplary embodiments of the present invention, shock absorption members formed on sidewalls of a case supports a support board, thereby reducing an impact of an external shock and projecting fragile elements, such as a light converting material layer, a TFT and a glass substrate, of an X-ray detection array. In addition, it may be easy to assemble the shock absorption members and the support board although a gap between an inner wall of the case and the support board is narrow.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A digital X-ray detector comprising:
    an X-ray detection array configured to detect an X-ray image when a subject is irradiated with X-ray;
    a support board supporting a bottom of the X-ray detection array;
    a case accommodating both the X-ray detection array and the support board and having a plurality of insertion portions formed on four sidewalls thereof; and
    shock absorption members, each installed to a respective one of the insertion portions and having a head resting on an outer wall of the case and a protrusion extended from the head to thereby be in contact with a sidewall of the support board,
    wherein a plurality of insertion holes, each included in a respective one of the insertion portions, are formed on sidewalls of the case in a horizontal direction, and each of the shock absorption members is inserted through a respective one of the insertion holes.

2. The digital X-ray detector of claim 1, wherein the heads are connected to each other to form a closed loop, thereby encompassing a side circumference of the case.

3. The digital X-ray detector of claim 1, wherein the protrusions are fixed onto sidewalls of the support board.

4. The digital X-ray detector of claim 1, further comprising:
    fixing members, each encompassing a respective one of the shock absorption members in a fixed manner using adhesive so as to fix the shock absorption members onto the case.

5. The digital X-ray detector of claim 1, further comprising
    corner insertion portions, each formed on a respective corner among four corners of the case; and
    corner shock absorption members, each installed in a respective one of the corner insertion portions and having a corner head resting on the respective corner of the case and a corner protrusion extended from the corner head to be inserted through the respective one of the corner insertion portions to thereby be in contact with a corner of the support board.

6. The digital X-ray detector of claim 1, further comprising:
    a buffer inserted between a top surface of the X-ray detection array and an inner top surface of the case.

7. A digital X-ray detector comprising:
    an X-ray detection array configured to detect an X-ray image when a subject is irradiated with X-ray;
    a support board supporting a bottom of the X-ray detection array;
    a case accommodating both the X-ray detection array and the support board and having a plurality of insertion portions formed on four sidewalls thereof; and
    shock absorption members, each installed to a respective one of the insertion portions and having a head resting on an outer wall of the case and a protrusion extended from the head to thereby be in contact with a sidewall of the support board,
    wherein each of the plurality of insertion portions comprises a rectangular hole extended from a sidewall of the case on a horizontal direction, and each of the shock absorption members is to be fitted to a respective rectangular hole.

8. The digital X-ray detector of claim 7, wherein the heads are connected to each other to form a closed loop, thereby encompassing a side circumference of the case.

9. The digital X-ray detector of claim 7, wherein the protrusions are fixed onto sidewalls of the support board.

10. The digital X-ray detector of claim 7, further comprising:
    fixing members, each encompassing a respective one of the shock absorption members in a fixed manner using adhesive so as to fix the shock absorption members onto the case.

11. The digital X-ray detector of claim 7, further comprising
    corner insertion portions, each formed on a respective corner among four corners of the case; and corner shock absorption members, each installed in a respective one of the corner insertion portions and having a corner head resting on the respective corner of the case and a corner protrusion extended from the corner head to be inserted through the respective one of the corner insertion portions to thereby be in contact with a corner of the support board.

12. The digital X-ray detector of claim 7, further comprising:
a buffer inserted between a top surface of the X-ray detection array and an inner top surface of the case.

13. A digital X-ray detector comprising:
an X-ray detection array configured to detect an X-ray image when a subject is irradiated with X-ray;
a support board supporting a bottom of the X-ray detection array;
a case accommodating both the X-ray detection array and the support board and having a plurality of insertion portions formed on four sidewalls thereof; and
shock absorption members, each installed to a respective one of the insertion portions and having a head resting on an outer wall of the case and a protrusion extended from the head to thereby be in contact with a sidewall of the support board,
wherein the case comprises:
a cabinet having four sidewalls and an open top;
a cover covering the open top of the cabinet in a fixed manner; and
a plurality of cut grooves formed on a sidewall of the cabinet in a horizontal direction by cutting a top edge of the sidewall of the cabinet, and
wherein the shock absorption members are fitted to the plurality of cut grooves, respectively.

14. The digital X-ray detector of claim 13, wherein the heads are connected to each other to form a closed loop, thereby encompassing a side circumference of the case.

15. The digital X-ray detector of claim 13, wherein the protrusions are fixed onto sidewalls of the support board.

16. The digital X-ray detector of claim 13, further comprising:
fixing members, each encompassing a respective one of the shock absorption members in a fixed manner using adhesive so as to fix the shock absorption members onto the case.

17. The digital X-ray detector of claim 13, further comprising
corner insertion portions, each formed on a respective corner among four corners of the case; and
corner shock absorption members, each installed in a respective one of the corner insertion portions and having a corner head resting on the respective corner of the case and a corner protrusion extended from the corner head to be inserted through the respective one of the corner insertion portions to thereby be in contact with a corner of the support board.

18. The digital X-ray detector of claim 13, further comprising:
a buffer inserted between a top surface of the X-ray detection array and an inner top surface of the case.

* * * * *